(12) United States Patent
Sutterlin et al.

(10) Patent No.: US 6,414,968 B1
(45) Date of Patent: Jul. 2, 2002

(54) TRANSMISSION AND DETECTION OF DATA IN A DUAL CHANNEL TRANSCEIVER

(75) Inventors: Philip H. Sutterlin, Saratoga; Walter J. Downey, Los Gatos; Mark Adrian Stubbs, Felton; Luna Chen, Mountain View, all of CA (US)

(73) Assignee: Echelon Corporation, San Jose, CA (US)

( * ) Notice: Subject to any disclaimer, the term of this patent is extended or adjusted under 35 U.S.C. 154(b) by 0 days.

(21) Appl. No.: 09/183,565

(22) Filed: Oct. 30, 1998

(51) Int. Cl.[7] ............... H04M 11/04; H04K 1/10; H04L 27/28; H04J 1/00
(52) U.S. Cl. ............... 370/480; 340/310.02; 375/260
(58) Field of Search ............... 370/216, 225, 370/228, 464, 480, 343, 344; 340/310.01, 310.02; 455/550, 553; 375/316, 346, 347, 260, 349; 714/820

(56) References Cited

U.S. PATENT DOCUMENTS

| | | | |
|---|---|---|---|
| 3,253,259 A | * 5/1966 | Jacoby | 178/69 R |
| 4,809,296 A | 2/1989 | Braun et al. | |
| 5,239,306 A | * 8/1993 | Siwiak et al. | 340/7.35 |
| 5,355,114 A | 10/1994 | Sutterlin et al. | 340/310.02 |
| 5,463,662 A | 10/1995 | Sutterlin et al. | 375/351 |
| 5,471,209 A | 11/1995 | Sutterlin et al. | 341/143 |
| 5,553,081 A | 9/1996 | Downey et al. | 714/709 |
| 5,598,221 A | * 1/1997 | Miyahara et al. | 348/554 |
| 5,701,240 A | 12/1997 | Downey et al. | 363/35 |
| 5,703,766 A | 12/1997 | Sutterlin et al. | 363/35 |
| 6,084,926 A | * 7/2000 | Zak et al. | 375/232 |

FOREIGN PATENT DOCUMENTS

| | | |
|---|---|---|
| EP | 0756389 A1 | 1/1997 |
| EP | 0998053 A3 | 5/2000 |

OTHER PUBLICATIONS

LonWorks PLT–21 Power Line Transceiver User's Guide, Version 2, Echelon Corporation, 1996–1997.

* cited by examiner

Primary Examiner—Huy D. Vu
Assistant Examiner—Kevin C. Harper
(74) Attorney, Agent, or Firm—Blakely, Sokoloff, Taylor & Zafman LLP

(57) ABSTRACT

A dual channel transceiver which operates at two different frequencies and which may be used in a network using older transceivers operating at a single frequency is disclosed. A pilot tone is transmitted by the transceiver when it is using the second channel to cause the older transfers to remain synchronized and thereby prevent them from transmitting data which would otherwise interfere with the data on the second channel. The relative magnitude of the signals on both channels is compared to prevent the detection of cross-talk on the second channel as data.

10 Claims, 4 Drawing Sheets

TRANSMISSION AND DETECTION OF DATA IN A DUAL CHANNEL TRANSCEIVER

BACKGROUND OF THE DISCLOSURE

1. Field of the Invention

The invention relates to the field of transceivers such as those used to transmit and receive data over a power line and particularly where the transceiver includes two channels operating at different frequencies.

2. Prior Art

Transceivers for transmitting and receiving data over power lines as well as over other media, are well-known. Generally, binary data is transmitted by modulating a carrier frequency. Echelon Corporation of Palo Alto, California manufactures and sells its PLT-21 transceiver which transmits and receives data with a carrier frequency of approximately 131 kHz over power lines. Different aspects of this transceiver are described in U.S. Pat. Nos. 5,471,209; 5,463,662; 5,553,081; 5,703,766; 5,701,240 and USSN. 08/661,136; filed Jun. 10, 1996 which is assigned to the assignee of the present invention.

The present invention grew out of an improvement to the PLT-21 transceivers, specifically an improvement to add a second channel. The second channel, as will be discussed, is used to transmit data when it appears that the first channel is blocked, for instance, by noise on the power line.

In U.S. Pat. No. 5,355,114 a transceiver is described that broadcasts data simultaneously on two channels and then selects between the channels by examining the noise on the channels. As will be seen this is different than the present invention where data is only transmitted in a single channel at any given time.

SUMMARY OF THE INVENTION

A method for transmitting data from a transmitter having a first and second channel is described. The data is transmitted at a first power level when the data is transmitted on the first channel without transmitting any signal at all on the second channel. When it appears that the first channel is blocked, a retry is made on the second channel with data being transmitted on the second channel at a power level slightly less than the power level used on the first channel. A pilot or synchronization signal is simultaneously transmitted on the first channel at a somewhat lower power level. This pilot tone keeps the network timing of transceivers having only the first channel, synchronized and thereby prevents them from transmitting data onto the line at the same time that second channel signals are on the line. If transmissions were to occur on the first channel they would interfere with transmissions being made over the second channel.

Other aspects of the present invention will become apparent from the following Detailed Description.

DETAILED DESCRIPTION OF THE PRESENT INVENTION

A transceiver which receives and transmits over two channels, each having a different frequency, is described. In the following description, numerous specific details are set forth such as specific frequencies and packet formats, to provide a thorough understanding of the present invention. It will be apparent to one skilled in the art that the present invention may be practiced without these details. In other instances, well-known circuits have not been set forth in detail in order not to obscure the present invention.

Figure 1:
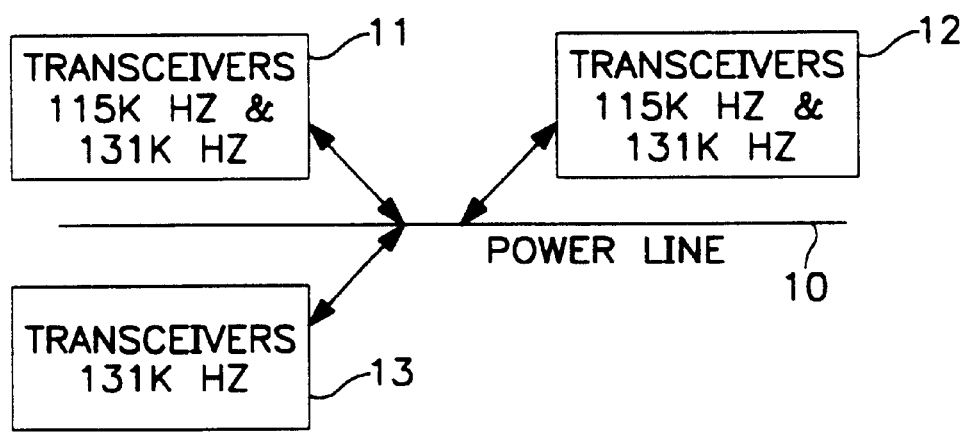
FIG. 1 is a block diagram showing several transceivers connected to a common power line.

In FIG. 1, three transceivers 11, 12 and 13 are illustrated coupled to a common power line 10. Each of the transceivers is able to transmit data onto and receive data from the power line 10. The transceiver 13 is a prior art transceiver such as the PLT-21 transceiver from Echelon Corporation. This transceiver transmits and receives data on a single channel having a carrier frequency of approximately 131 kHz. Transceivers 11 and 12 are improvements to the transceiver 13 in that transceivers 11 and 12 include a second channel (as well as other improvements). The second channel transmits and receives data at a frequency of approximately 115 kHz. (More precisely the second channel operates at a carrier frequency of 10 MHz÷86 6/7, and the first channel at 10 MHz÷76.)

A problem arises when the two channel transceivers such as transceivers 11 and 12 are added to a network having transceivers with only a single channel such as transceiver 13. If transceivers 11 and 12 were to communicate between one another at a frequency of 115 kHz, the transceiver 13 would not detect such transmissions. As such, transceiver 13 may begin transmitting onto the power line while communications are occurring between transceivers 11 and 12. The transmission from transceiver 13 could interfere with the communications between the transceivers 11 and 12. For instance, if transceiver 13 is trying to communicate with transceiver 11 or 12, these transceivers and their associated processors such as the Neuron® cells from Echelon Corporation are busy and unable to process data on two channels at once.

To prevent this interference, transceivers 11 and 12 operate using the 131 kHz frequency as long as data is being successfully transmitted and received. In a protocol which requires an acknowledgement for each packet being transmitted, attempts are first made to transmit data at the frequency of 131 kHz. If no acknowledgement is received, the last two retries are made at the frequency of 115 kHz if the transmitting transceiver has this second channel. If the retries are to a transceiver having a second channel at the 115 kHz frequency, the retry may be more successful than the original transmission. Typically in power line communications, noise occurs in relatively narrow bands and thus noise which is interfering with a transmission at 131 kHz may not interfere with a transmission at 115 kHz. If the acknowledgement is being sought from a transceiver having only a single channel of 131 kHz, no harm is done by transmitting a retry at 115 kHz. However, this does not prevent the single channel, 131 kHz transceiver from transmitting during the retry and interfering with the retry. The method used to prevent this interference is discussed later.

One protocol implemented through these transceivers is the LonTalk® Protocol from Echelon Corporation. With this protocol a bit known as "alternate path" is set whenever the last two tries of a message requesting an acknowledgement is sent. This bit, when received, causes the receiving transceiver to transmit an acknowledgement or response at the 115 kHz when a response is called for.

With the LonTalk® Protocol unacknowledged transmissions which are repeated several times are sometimes made. This is used where the same message is being sent to a plurality of nodes. Acknowledgements from all the nodes could overwhelm the available network bandwidth. When there are transceivers with two channels on the network, the unacknowledged message is transmitted, first at the 131 kHz frequency and then at the 115 kHz frequency. This again facilitates the completion of a communications where the 131 kHz channel is blocked and the lower frequency of 115 kHz remains open.

In the transceivers with two channels, a signature of the outgoing message is generated for each message. When the same signature is encountered, the transceiver knows to retry the message at the 115 kHz frequency in the case of the unacknowledged repeat message. This retry at 115 kHz can be selected to occur for every other, or every third transmission. Thus the transceiver itself controls which frequency is used without disturbing the protocol residing elsewhere in the system. Note, the alternate path bit previously discussed is not set for this mode.

As mentioned, a problem can occur when the transceiver 11 is transmitting at the 115 kHz frequency and transceivers are on the line 10 of FIG. 1 which transmit and receive only at the 131 kHz frequency such as transceiver 13. The transceiver 13 will not detect the 115 kHz carrier from transceiver 11. Consequently, the transceiver 13 may begin to transmit during the transmission of transceiver 11 since its circuitry believes there is no transmission on the power line. As mentioned, if transceiver 13 begins transmitting when transceiver 11 is transmitting, interference could cause the loss of data.

Figure 2:
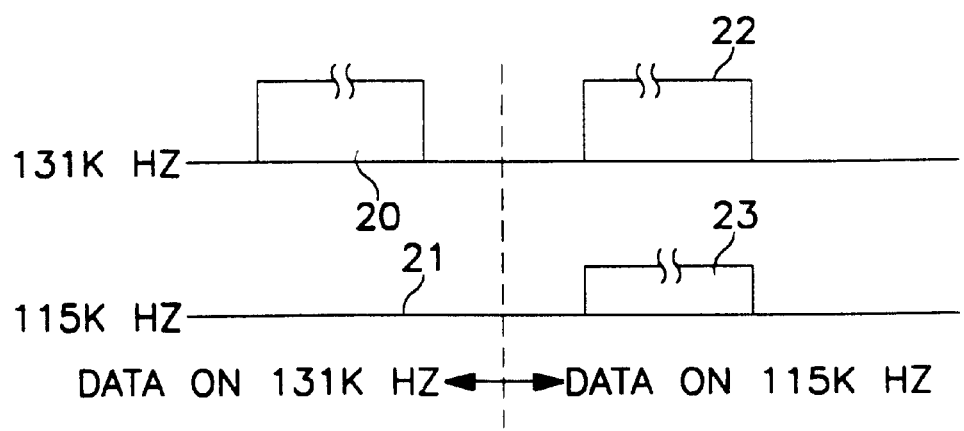
FIG. 2 shows waveforms for the two channels, to illustrate the transmission of data and a pilot tone at two different frequencies.

Referring to FIG. 2 the transmission format used to avoid this interference is shown. All transceivers favor use of the 131 kHz. Thus, during normal, unblocked operation, data such as shown by the waveform 20 is transmitted. All transceivers detect the 131 kHz frequency and accordingly will not transmit while another one of the transceivers is transmitting. Thus, during this period of time, there is no signal on the 115 kHz channel as shown at time 21 of FIG. 2. Those transceivers with the 115 kHz channel do not transmit if there is a transmission in progress at either 131 kHz or 115 kHz.

When it becomes necessary to transmit data at the 115 kHz frequency, the data is transmitted as shown by waveform 23. A signal as shown by waveform 22, is transmitted simultaneously on the 131 kHz channel. The signal on this latter channel is not meaningful data, and represents only a synchronization signal or pilot tone. The pilot tone is received by all the transceivers and particularly by those which only have the 131 kHz channel. A transceiver such as transceiver 13 detecting the tone, remains synchronized and as such will not transmit data since it is essentially made to believe that data is being transmitted by another transceiver.

The pilot tone is a string of binary bits that could unintentionally be detected as data by one of the receiving transceivers. To prevent this from occurring, a cyclic redundancy check (CRC) code that does not match the string of binary bits in the pilot tone is transmitted with the pilot tone. This causes a processor receiving the pilot tone to reject it.

With the transceivers such as shown in FIG. 1, the maximum transmission power is regulated in many countries. Thus, when two channels are transmitting simultaneously such as shown by waveforms 22 and 23, the total power associated with these waveforms cannot exceed the total power associated with the waveform 20. In one embodiment, in order to stay within these maximum power limitations, the transmission on the 115 kHz represented by waveform 23, is slightly less than the power associated with the waveform 20. The power associated with the waveform 22 is also less, for example it is 7 dB below the maximum power transmitted on the 131 kHz channel. This is generally sufficient power for the pilot tone, without significantly degrading the performance of the 115 kHz channel.

The transceivers of FIG. 1 may be used in conjunction with the LonTalk® Protocol as mentioned. A typical packet sent with this protocol over the 131 kHz channel is shown in the upper half of FIG. 3. The packet begins with a bit synchronization signal 31, also referred to as "dotting." 24 bit times of dotting are transmitted in order to allow the transceiver to detect the carrier and to synchronize its bit clock. Following this, there is a word synchronization field 32 of eleven bit times to allow word synchronization. At this point in time, the receiver, if it has properly detected the bit and word synchronization signals, provides a receive enable signal (RXEN) and then data begins to be detected as shown by the first data field 33.

Figure 3:
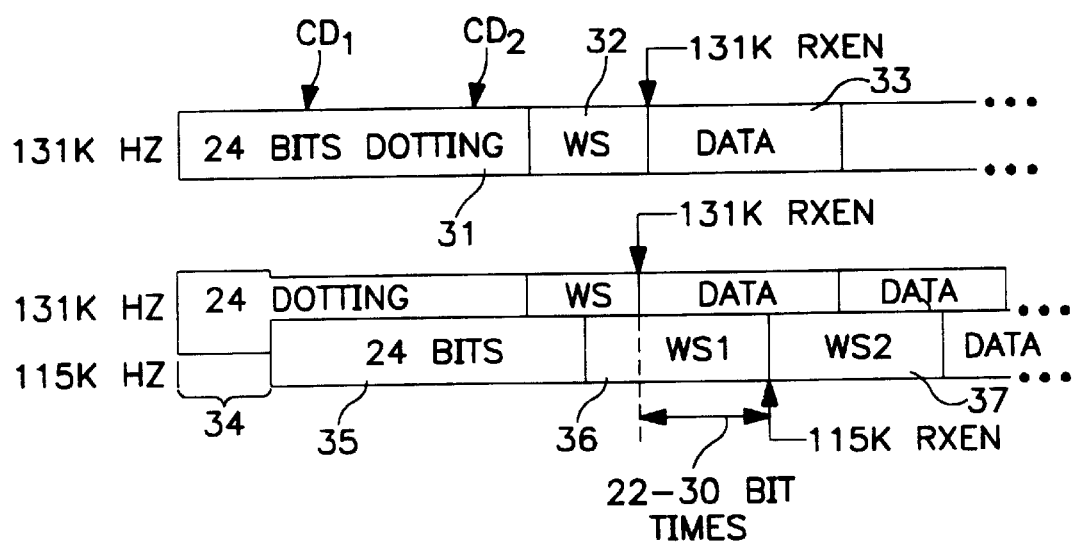
FIG. 3 is a diagram illustrating the packet format for the beginning of the data packets for the two channels.

In the lower half of FIG. 3, the transmission of the 131 kHz pilot tone and data on the 115 kHz channel is shown. The data organization on the 115 kHz channel is somewhat different than that on the 131 kHz channel for the LonTalk® Protocol. For the 115 kHz channel, there is an initial period 34 that may be 1 to 9 bit times when only the 131 kHz dotting of the 131 kHz channel is transmitted. During this period the 115 kHz channel is determining from the alternate path bit and the signature, if it will be transmitting. Assuming it will transmit, the field 35 having 24 bit times of bit synchronization signals or dotting for the 115 kHz channel is transmitted. As shown above field 35, the 131 kHz signal continues but as the pilot signal previously discussed. Then two fields, 36 and 37 for word synchronization are transmitted. (For 115 kHz format, error correcting code bits and word count bits are embedded in the fields 36 and 37).

In the receiver if the bit and word synchronization has been properly received in the 115 kHz bit channel, the 115 k RXEN signal occurs indicating the transceiver is enabled for the 115 kHz channel. (The other conditions needed before the 115 kHz channel is selected are discussed below.) Note from FIG. 3, that the 131 k RXEN can occur 22–30 bit times before the 115 k RXEN signal, this is discussed later.

When the 131 kHz signal is being transmitted alone such as shown by waveform 20, one would not expect that the 115 k RXEN signal would ever occur. This is not always the case. There can be cross-talk from the 131 kHz channel into the 115 kHz channel which causes the generation of the 115 k RXEN signal.

As shown in FIG. 3 during the dotting time, the receiver for the 131 kHz channel detects the 131 kHz carder and generates internal signals known as carrier detect (CD1 and CD2). The corresponding signals are generated in the 115 kHz channel but are not discussed since they are not needed for the discussion below.

Figure 5:
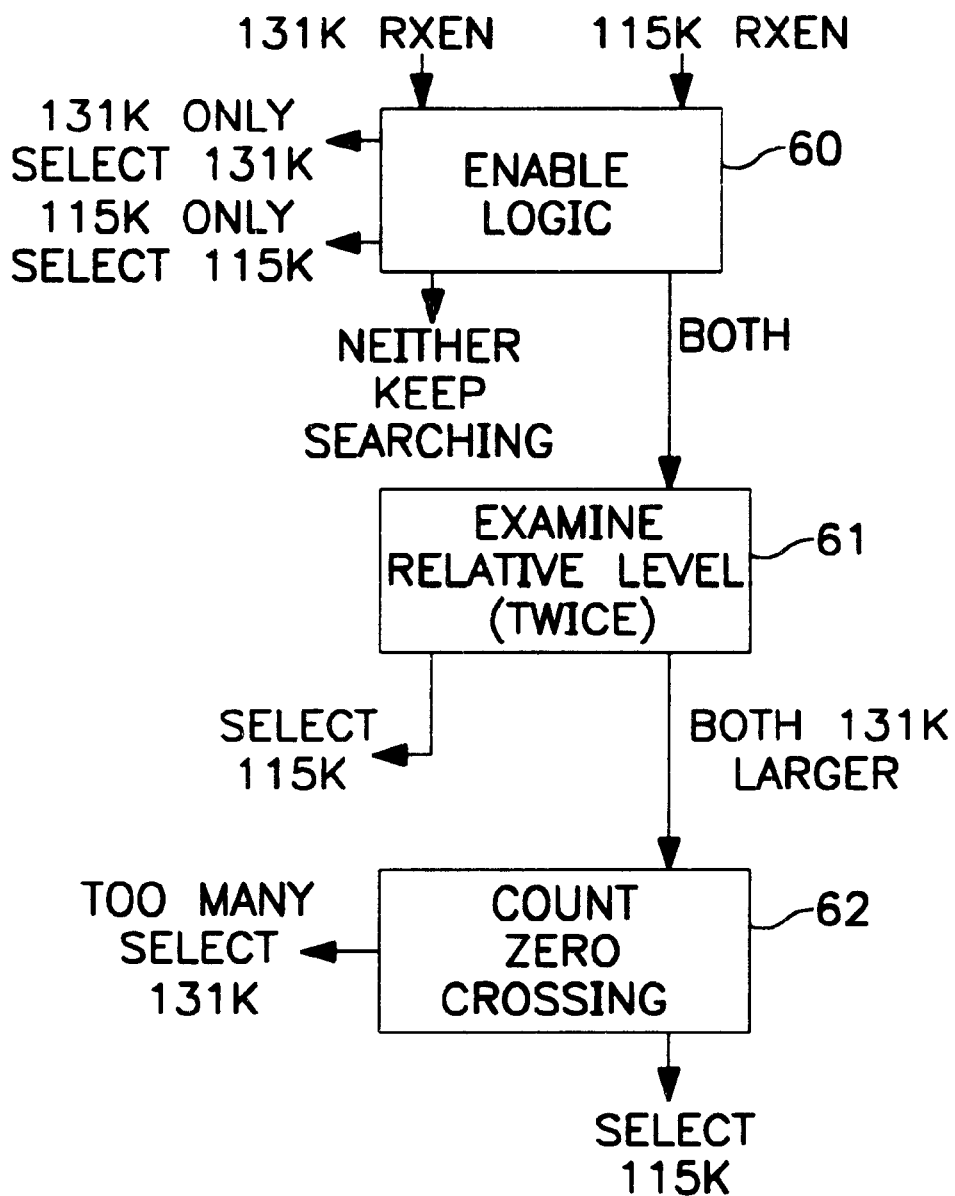
FIG. 5 illustrates the method of the present invention.

The method used for assuring that there is data on the 131 kHz channel even if 115 k RXEN is present is shown in FIG. 5. In FIG. 5 one step in the evaluation is shown by the enable logic step 60. This logic is relatively straight forward as follows: (i) if only 131 k RXEN is present then assume data is present only on the 131 kHz channel, (ii) if only the 115 k RXEN is present, assume that data is only present on the 115 kHz channel, (iii) if neither are present then the transceiver continues to search since it is assumed that there is no data present. The difficult problem occurs when both the 131 k RXEN signal and the 115 k RXEN signal are present during the 22–30 bit times shown in FIG. 3. When this occurs, steps 61 and 62 are used to assure that there very likely is no data on the 131 kHz channel and thus the 115 kHz channel should be selected.

As shown by step 61 the relative signal strength in the channels is examined. If the signal level in the 115 kHz channel is at least 24 dB lower than in the 131 kHz channel, this is one condition that is considered in selecting the 131 kHz channel. This relative signal strength is measured at two different times as will be described in conjunction with FIG. 4. In the receiver the input signal is resolved into two quadrature base band signals as is often done in the prior art. These signals are generally referred to as the I and Q signals. Another condition shown by step 62, is the number of zero crossings in the larger of the I signal and the Q signal of the 115 kHz signal. The number of zero crossings are counted for the bit time preceding the occurrence of the second carrier detect signal in the 131 kHz channel (CD2). If this count is 4 or greater, then in one embodiment of the present invention, it is assumed that noise is being detected in the 115 kHz channel and the 131 kHz channel is selected.

Figure 4:
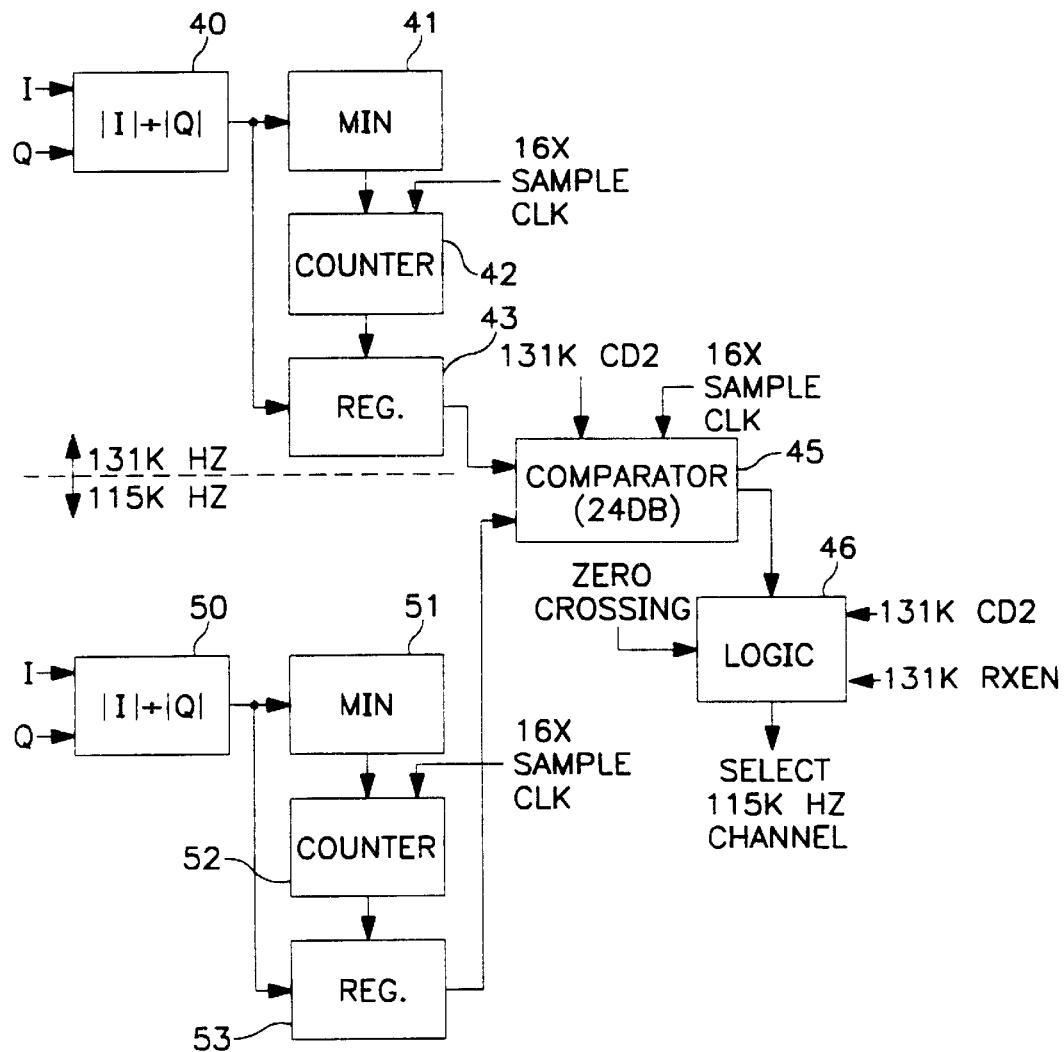
FIG. 4 is a block diagram showing an apparatus of the present invention used for selecting between the two channels.

Referring now to FIG. 4, the prior art transceivers include a circuit 40 for determining, essentially, the magnitude (absolute value) of the base band signal. In fact, it is an approximation of the magnitude. Rather than compute the square root of the sum of the squares of the signals in the I and Q channels, the sum of the magnitude of the I and Q signals is used. Thus the output of the circuit 40 for the 131 kHz channel represents the magnitude of the data signal received on the 131 kHz channel.

The transceiver also includes a circuit 41 which detects the minimum magnitude signal from the circuit 40 for each bit time. This circuit is used for other purposes in the transceiver, but is also used in the circuit of FIG. 4. It is the maximum signal level that is needed in the comparison of the present invention not the minimum, as discussed above. The maximum magnitude is developed from the minimum magnitude by waiting 8 counts after the detection of the minimum, before accepting the output of the circuit 40 as the maximum. The sample clock for the signal at this point in the receiver is 16×the bit rate. Consequently, the maximum should occur 8 counts after the minimum is detected. The counter 42 which is reset when the minimum occurs, counts to 8 and when the 8th count is reached, the output of the circuit 40 is transferred into the register 43. This is done in synchronous with the sample clock so that the proper value is transferred into the register 43. The result is that for each bit time the maximum value for the 131 kHz channel is stored in the register 43.

The same circuitry is duplicated for the 115 kHz channel, it includes the circuit 50 which determines the magnitude of the I and Q signals, and the circuit 51 which determines the minimum magnitude. The circuit 51 causes the 8 bit counter 52 to be reset and again the counter is clocked by the 16×bit clock. The register 53 records the output of the circuit 50 which represents the maximum magnitude for each bit time in the 115 kHz channel.

As implemented, the samples in the I and Q channel are represented as floating point numbers having an exponent and mantissa. The registers 43 and 53 capture only the exponent value. When the values in registers 43 and 53 are compared in the comparator 45, the comparison determines whether the value from register 43 is 24 dB above the value from register 53. However, since only the exponents are used the accuracy of this determination is +/−6 dB.

The comparison of the contents of registers 43 and 53 is made at two different times in one embodiment of the invention. The first time is when CD2 occurs in the 131 kHz channel, and thereafter, when the RXEN signal occurs in the 131 kHz channel. In each of these times, if the value in register 43 is 24 dB+/−6 dB above the value of the contents of register 53, then a condition for selecting the 131 kHz signal is met.

The logic implemented by logic 46 is that 3 conditions are needed to select the 131 kHz channel, otherwise the 115 kHz channel is selected. The conditions are: (i) 115 kHz<131 kHz by 24 dB at CD2, (ii) 115 kHz<131 kHz by 24 dB at RXEN in the 131 kHz channel, (iii) 4 zero crossings or more in the larger of the I and Q signals of the 115 kHz signal in the bit time preceding CD2 in the 131 kHz channel.

The zero crossing requirement was previously discussed and in summary, a separate circuit not shown examines the number of zero crossings in the larger of the I and Q signals of the 115 kHz channel for the bit time preceding the occurrence of the 131 k CD2 signal. The number of zero crossings in the channel with the larger signal is retained on an continuous basis within the receiver thus allowing the previous bit time to be examined when the 131 k CD2 signal becomes active. If there are four or more crossings in the larger of the I or Q signals of the 115 kHz channel, then it is assumed that there is cross-talk and the 131 kHz signal is valid data, provided the comparison tests discussed above indicate a strong signal in the 131 kHz channel. Otherwise the 115 kHz channel is selected.

Thus, an apparatus and method has been detected for using two channels in a transceiver both of which operate at different frequencies where only one channel transmits data at a time. The transceivers can be used in networks with transceivers which receive only a single one of the channels.

We claim:

1. A method for selecting between a first and a second channel in a receiver where the first and second channel receive data on carriers having a first and second frequency, respectively, where the first and second channels provide first and second enable signals, respectively, indicating that data is present on its channel, comprising:

selecting the data on a first channel if the first enable signal is present and the second enable signal is not present;

selecting the data on the second channel if the second enable signal is present and the first enable signal is not present; and examining the relative signal levels in the first and second channels at two different times if both the first and second enable signals are present.

2. The method defined by claim 1 wherein the examination step includes;

determining if the signal level in the second channel is a predetermined level below the signal level in the first channel, and where one of the times is when the enable signal in the first channel occurs.

3. The method defined by claim 2 including the step of examining the number of zero crossings in the second channel within a predetermined time.

4. The method defined by claim 1, 2 or 3 wherein the first frequency is approximately 131 kHz and the second frequency is approximately 115 kHz.

5. A method for selecting between a first and a second channel in a receiver where the first and second channel receive modulated carriers having first and second frequencies, respectively, when there is an indication that data may be present on both channels comprising:

determining a signal level in the first channel;

determining a signal level in the second channel;

comparing the signal levels in the first and second channels at two different times;

using as a factor in selecting the first channel the results of the comparison when the signal level in the first channel is substantially larger than the signal level in the second channel.

6. The method defined by claim 5 wherein the comparison examines the first level to determine if it is at least 18 dB above the second signal level.

7. The method defined by claim 5 wherein one of the times that the comparison is made is when the indication that data is present in the first channel occurs.

8. The method defined by claims 5 or 7 wherein the number of zero crossings within a predetermined time in the second channel is determined and used as one of the factors in the selecting.

9. The method defined by claim 8 wherein the first frequency is approximately 131 kHz and the second frequency is approximately 115 kHz.

10. A method for selecting between a first and a second channel in a receiver where the first and second channel receive data on carriers having a first and second frequency, respectively, where the first and second channels provide first and second enable signals, respectively, indicating that data is present on its channel, comprising:

selecting the data on a first channel if the first enable signal is present and the second enable signal is not present;

selecting the data on the second channel if the second enable signal is present and the first enable signal is not present; and examining the number of zero crossings in at least one of the first and second channels during a predetermined time if both the first and second signals are present.

\* \* \* \* \*